US008892876B1

(12) United States Patent
Huang et al.

(10) Patent No.: US 8,892,876 B1
(45) Date of Patent: Nov. 18, 2014

(54) SECURED APPLICATION PACKAGE FILES FOR MOBILE COMPUTING DEVICES

(75) Inventors: Zhentao Huang, Nanjing (CN); Shuhua Chen, Nanjing (CN); Yinfeng Qiu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 119 days.

(21) Appl. No.: 13/451,807

(22) Filed: Apr. 20, 2012

(51) Int. Cl.
*G06F 21/00* (2013.01)
*G06F 21/62* (2013.01)

(52) U.S. Cl.
CPC .................................. *G06F 21/6218* (2013.01)
USPC ........................................................... 713/165

(58) Field of Classification Search
CPC ................................................... G06F 21/6218
USPC ........................................................... 713/165
See application file for complete search history.

(56) References Cited

U.S. PATENT DOCUMENTS

| 5,966,702 | A | 10/1999 | Fresko et al. | |
|---|---|---|---|---|
| 6,907,530 | B2* | 6/2005 | Wang | 726/12 |
| 7,340,058 | B2* | 3/2008 | Jakobsson et al. | 380/251 |
| 2002/0099940 | A1* | 7/2002 | Wang | 713/168 |
| 2002/0147044 | A1* | 10/2002 | Jakobsson et al. | 463/42 |
| 2005/0141706 | A1* | 6/2005 | Regli et al. | 380/44 |
| 2005/0173518 | A1* | 8/2005 | Takayama | 235/380 |
| 2005/0202803 | A1* | 9/2005 | Mahalal | 455/410 |
| 2007/0127418 | A1* | 6/2007 | Pekkala et al. | 370/338 |
| 2010/0292556 | A1* | 11/2010 | Golden | 600/364 |
| 2011/0113473 | A1* | 5/2011 | Corda et al. | 726/3 |
| 2011/0320359 | A1* | 12/2011 | Li et al. | 705/71 |
| 2012/0002654 | A1* | 1/2012 | Pekkala et al. | 370/338 |
| 2012/0222129 | A1* | 8/2012 | Racciopi et al. | 726/27 |
| 2013/0117850 | A1* | 5/2013 | Britton et al. | 726/23 |
| 2013/0117854 | A1* | 5/2013 | Britton et al. | 726/24 |

OTHER PUBLICATIONS

Jian Kuang et al, "A Protective Mechanism Variable Instruction-Sets Encryption for Java Applications in Mobile Terminal Platforms", Oct. 2010, pp. 1-4.*
Thomas Biasing et al, "An Android Application Sandbox System for Suspicious Software Detection", Oct. 2010, IEE, pp. 55-62.*
Gilbert et al.; Vision: automated security validation of mobile apps at app markets; Published in: Proceeding MCS '11 Proceedings of the second international workshop on Mobile cloud computing and services; 2011; pp. 21-25; ACM Digital Library.*

(Continued)

*Primary Examiner* — Bradley Holder
(74) *Attorney, Agent, or Firm* — Okamoto & Benedicto LLP

(57) ABSTRACT

An ANDROID application package (APK) file for an application is repackaged into a secured APK file to protect a Dalvik executable (DEX) file of the application. The DEX file is encrypted to generate an encrypted DEX file that is included in the secured APK file along with a stub DEX file. The secured APK file is received in a mobile computing device where the stub DEX file is started to start a wrapper Activity. The wrapper Activity replaces an APK class loader of a mobile operating system of the mobile computing device with a decryptor class loader. The decryptor class loader decrypts the encrypted DEX file to recover the DEX file, and loads classes of the DEX file into a Dalvik virtual machine. The original Activity of the application is then started to provide the functionality of the application in the mobile computing device.

11 Claims, 4 Drawing Sheets

(56) References Cited

OTHER PUBLICATIONS

Delac et al.; Emerging security threats for mobile platforms; Published in: MIPRO, 2011 Proceedings of the 34th International Convention Date of Conference: May 23-27, 2011; pp. 1468-1473; IEEE Xplore.*

Dalvik (software)—From Wikipedia, the free encyclopedia, 1 sheet [retrieved on Mar. 28, 2012], retrieved from the internet: http://en.wikipedia.org/wiki/Dalvik_(software).

ProGuard Main, 1 sheet [retrieved on Apr. 3, 2012], retrieved from the internet: http://proguard.sourceforge.net/main.html.

ProGuard / Android Developers, 3 sheets [retrieved on Apr. 3, 2012], retrieved from the internet: http://developer.android.com/guide/developing/tools/proguard.html.

Application Fundamentals / Android Developers, 7 sheets [retrieved on Mar. 28, 2012], retrieved from the internet: http://developer.android.com/guide/topics/fundamental.html.

github:gist—A reflection hack to override the APK ClassLoader so you can launch Activities in an external JAR, 2 sheets [retrieved on Apr. 16, 2012], retrieved from the internet: https://gist.github.com/839003.

* cited by examiner

SECURED APPLICATION PACKAGE FILES FOR MOBILE COMPUTING DEVICES

BACKGROUND OF THE INVENTION

1. Field of the Invention

The present invention relates generally to computer security, and more particularly but not exclusively to methods and apparatus for securing application package files for mobile computing devices.

2. Description of the Background Art

Mobile operating systems are designed to be suitable for computers that are constrained in terms of memory and processor speed. The ANDROID operating system is a popular mobile operating system employed in mobile computing devices, including mobile phones and tablets. Application programs for the ANDROID operating system come in a file referred to as the ANDROID application package (APK) file. A problem with the APK file is that it is relatively easy to decompile to identify system application programming interface (API) call sequences. This makes the APK file vulnerable to reverse engineering for malicious, copying, and other purposes.

Code obfuscation has been employed to make applications in APK files difficult to reverse engineer. For example, the PROGUARD software tool may be employed to obfuscate JAVA code used in APK files. However, while code obfuscation makes the APK file harder to read, the APK file may still be readily decompiled to show the system calls employed by the application.

SUMMARY

In one embodiment, a computer-implemented method comprises receiving a secured application package file in a mobile computing device, the secured application package file comprising an encrypted Dalvik executable (DEX) file and a decryptor class loader. A class loader of a mobile operating system of the mobile computing device is replaced with the decryptor class loader. The decryptor class loader is used to decrypt the encrypted DEX file to recover a DEX file. The decryptor class loader, instead of the class loader of the mobile operating system, is used to load classes of the DEX file into a Dalvik virtual machine of the mobile operating system.

In another embodiment, a system comprises a computer system configured to unpack an application package file, to encrypt a first Dalvik executable (DEX) file of the application package file to generate an encrypted DEX file, and to include the encrypted DEX file, a second DEX file, and resource files of the application package file into a secured application package file; and a mobile computing device configured to receive the secured application package file, to execute the second DEX file to launch a decryptor class loader, to execute the decryptor class loader to decrypt the encrypted DEX file to recover the first DEX file, to execute the decryptor class loader to load classes of the first DEX file into a Dalvik virtual machine, and to execute the classes of the first DEX file in the Dalvik virtual machine.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
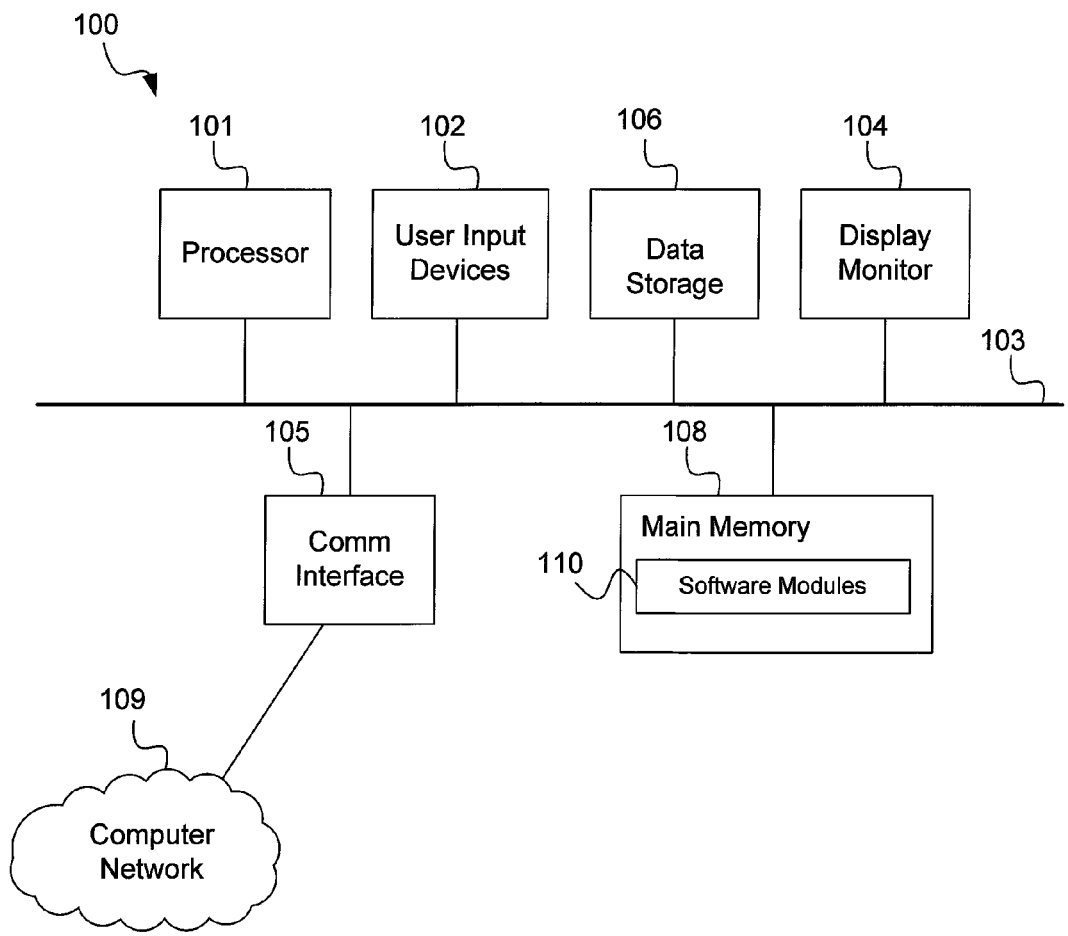
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., touch screen, keyboard, mouse), one or more data storage devices 106 (e.g., hard drive, optical disk, USB memory), a display monitor 104 (e.g., LCD, flat panel monitor, CRT), a communications interface 105 (e.g., network adapter, modem, cellular interface), and a main memory 108 (e.g., RAM). The communications interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. For example, the software modules 110 may comprise a repackaging module 211, an APK file 212, and a secured APK file 220 when the computer 100 is employed as a customer computer system 210 (see FIG. 2). As another example, the software modules 110 may comprise an ANDROID operating system 251 and the secured APK file 220 when the computer 100 is employed as an ANDROID device 250.

The computer 100 may be configured to perform method steps by executing the software modules 110. The software modules 110 may be loaded from the data storage device 106 to the main memory 108. The software modules 110 may also be made available on other computer-readable storage medium including optical disk, flash drive, and other memory devices.

Figure 2:
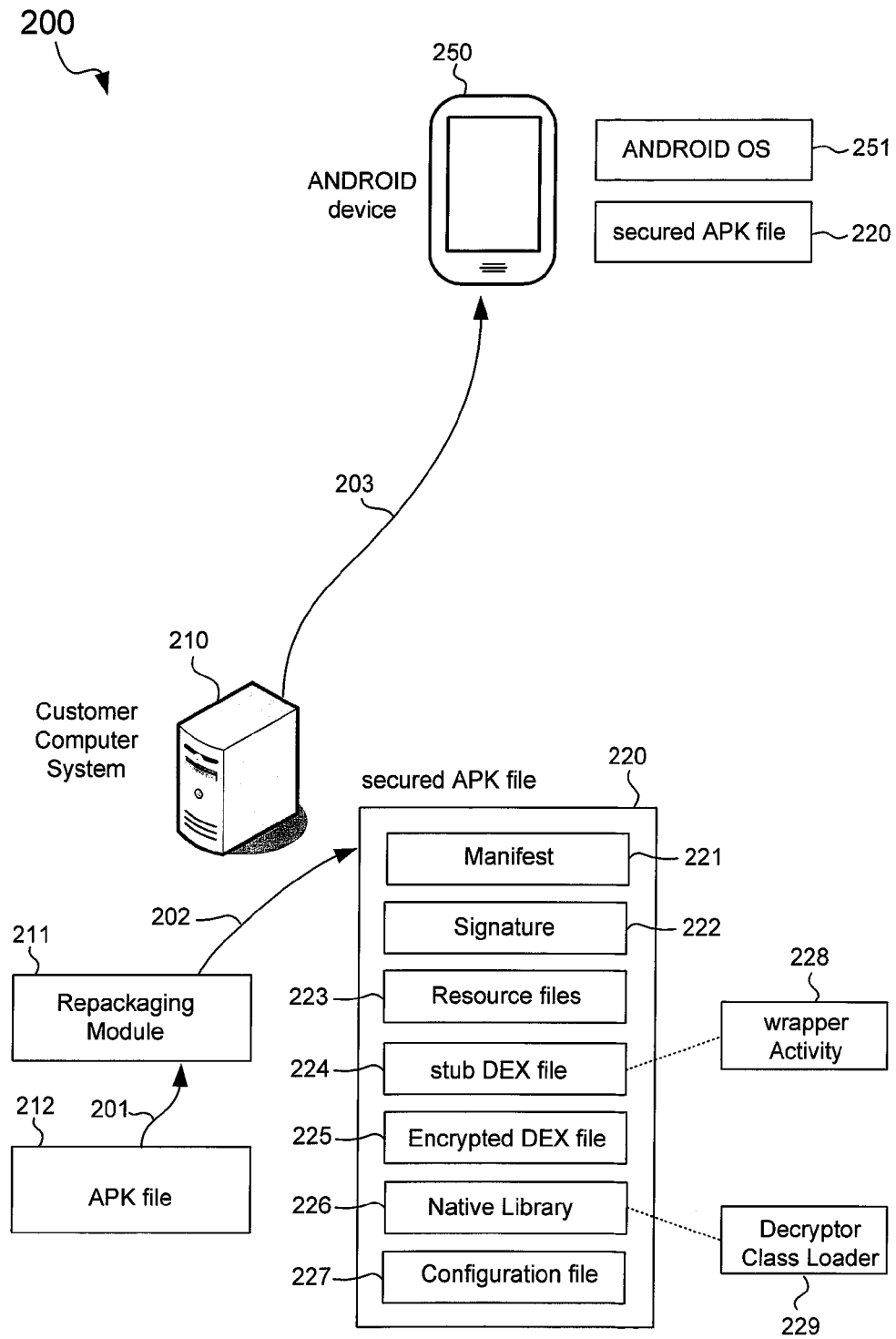
FIG. 2 shows a system for securing application package files for mobile computing devices in accordance with an embodiment of the present invention.

FIG. 2 shows a system 200 for securing application package files for mobile computing devices in accordance with an embodiment of the present invention. The system 200 may comprise a customer computer system 210 and one or more mobile computing devices running a mobile operating system. In the example of FIG. 2, the mobile computing device is an ANDROID device 250 running an ANDROID operating system 251. Accordingly, the use of the terms "object," "method", and "class" in the context of computer-readable program code in this disclosure refers to the use of those terms in object oriented programming (OOP) and the JAVA programming language in general.

The customer computer system 210 may comprise one or more computers configured to generate a secured application package file. In one embodiment, the customer computer system 210 includes a repackaging module 211, one or more APK files 212, and one or more secured APK files 220. The repackaging module 211 may comprise computer-readable program code for generating a secured application package file, which in the example of FIG. 2 comprises a secured APK file 220. The APK file 212 may comprise a conventional APK file of an application program ("application") for the ANDROID operating system. In one embodiment, the repackaging module 211 is configured to repackage an APK file 212 into a secured APK file 220. The repackaging module 211 may be implemented as a command line software tool. The customer computer system 210 is so named because it may be operated by a customer of a computer security vendor, such as Trend Micro, Inc., to protect the customer's applications included in application package files from reverse engineering.

In the example of FIG. 2, a secured APK file 220 comprises a manifest 221, a signature 222, resource files 223, a stub Dalvik executable (DEX) file 224, an encrypted DEX file 225, a native library 226, and a configuration file 227.

The manifest 221 may include extensions, package related data, and other information generally included in a manifest of an APK file. In the example of FIG. 2, the manifest 221 comprises the manifest of the APK file 212 and may include a reference to the wrapper Activity 228. The signature 222 comprises the digital signature of the provider of the secured APK file 220. The resource files 223 comprise additional files that the application uses, and in this example includes the resource files 223 of the APK file 212.

Generally speaking, in the ANDROID operating system, a DEX file comprises computer-readable program code that performs the general function of an application. A typical APK file has a DEX file. In the example of FIG. 2, the DEX file of the secured APK file 220 is a stub DEX file 224, which comprises an Activity referred to herein as a "wrapper Activity" 228. The wrapper Activity 228 comprises an Activity of the ANDROID operating system 251. In the ANDROID operating system, an Activity is a process of the application. The Activity 228 is so named because it wraps around or encapsulates the original Activity of the application of the APK file 212. In one embodiment, the wrapper Activity 228 is intended to replace the original class loader of Activity of the ANDROID operating system 251 with the decryptor class loader 229 upon execution to decrypt the encrypted DEX file 225, and to start the original Activity of the application by reading the configuration file 227.

In one embodiment, the encrypted DEX file 225 comprises the original DEX file of the APK file 212 ("original DEX file") but encrypted by the repackaging module 211 to prevent reverse engineering. That is, encryption of the original DEX file prevents it from being read even when the secured APK file 220 is unpacked. However, once encrypted, the original DEX file no longer conforms to the standard DEX format and thus can no longer be executed by the Dalvik virtual machine of the ANDROID operating system 251.

The decryptor class loader 229 may comprise computer-readable program code for loading classes into the Dalvik virtual machine of the ANDROID operating system 251. In one embodiment, the decryptor class loader 229 is a native implementation that uses the JAVA Native Interface (JNI) of the JAVA programming language. The decryptor class loader 229 may be configured to decrypt the encrypted DEX file 225 to recover the original DEX file of the APK 212 and to load the classes of the original DEX file into the Dalvik virtual machine of the ANDROID operating system 251. As can be appreciated, the classes of the original DEX file include the original Activities of the application. The secured APK file 220 thus allows the application to run as if the application was still packaged in the APK file 212.

In one embodiment, the native library 226 comprises the classes of the decryptor class loader 229. The wrapper Activity 228 may also be implemented in native code using the native library 226. The classes of the decryptor class loader 229 allow for decryption of the encrypted DEX file 225 to recover the original DEX file and to load the classes of the original DEX file into the Dalvik virtual machine for execution. In other words, the decryptor class loader 229 may comprise computer-readable program code for decrypting encrypted computer-readable program code of the application to recover the original computer-readable program code of the application, and to load the original computer-readable program code of the application into the virtual machine for execution by the virtual machine. The configuration file 227 comprises information that allows the stub DEX file 224 to identify which main Activity to load upon execution. In the example of FIG. 2, the configuration file 227 indicates to the stub DEX file 224 to load the wrapper Activity 228 as the main Activity.

In an example operation, the APK file 212 comprises a package file of an application for the ANDROID operating system 251. The repackaging module 211 parses the contents of the APK file 212 (arrow 201) to generate the secured APK file 220 using the contents of the APK file 212 (arrow 202). The customer computer system 210 forwards the secured APK file 220 to the ANDROID device 250 (arrow 203). The customer computer system 210 may forward the secured APK file 220 directly to the ANDROID device 250, by way of an ANDROID app store, or by way of another computer system.

The device 250 may comprise an ANDROID mobile phone, tablet, or other mobile computing devices that run the ANDROID operating system. In the device 250, the stub DEX file executes to run the wrapper Activity 228. The wrapper Activity 228 replaces the original class loader of Activity of the ANDROID operating system 251 with the decryptor class loader 229. The decryptor class loader 229 decrypts the encrypted DEX file of the APK file 212 to recover the original DEX file, and loads the classes of the original DEX file into the Dalvik virtual machine of the ANDROID operating system 251, thereby allowing the application to run in the device 250. Advantageously, the application cannot be reverse engineered in the device 250 because its original DEX file is in encrypted state prior to being loaded into the Dalvik virtual machine.

Figure 3:
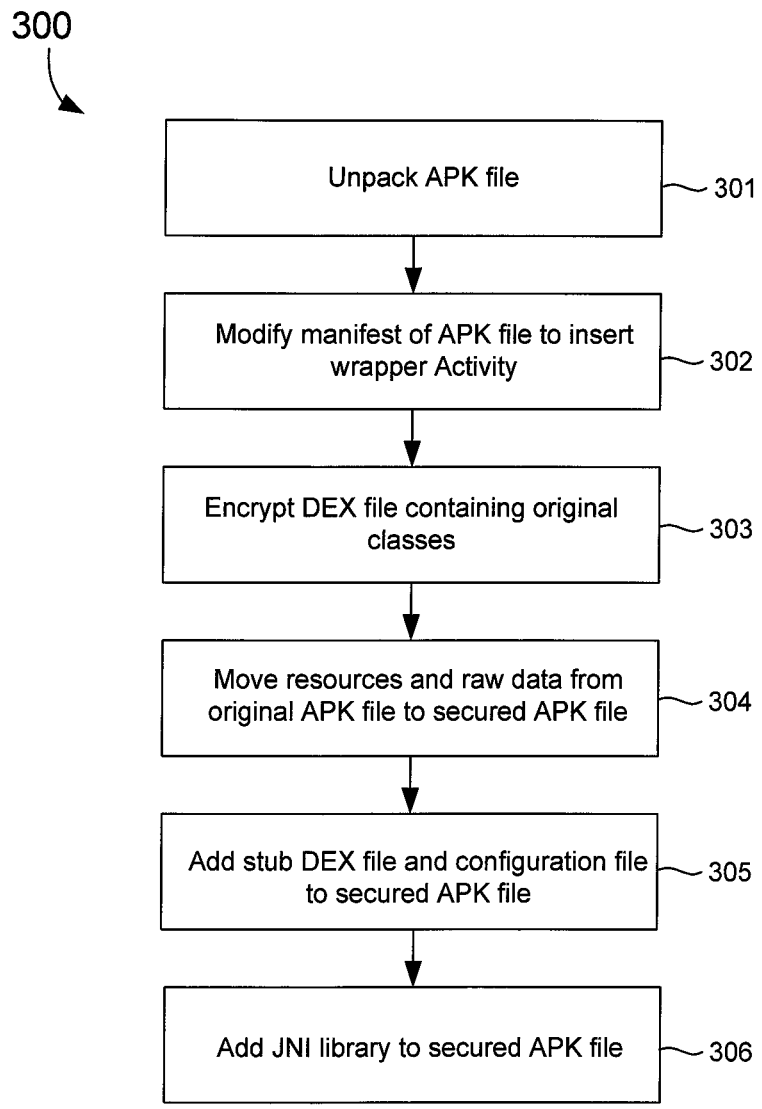
FIG. 3 shows a flow diagram of a computer-implemented method of creating a secured application package file in accordance with an embodiment of the present invention.

FIG. 3 shows a flow diagram of a computer-implemented method 300 of creating a secured application package file in accordance with an embodiment of the present invention. As its name implies, an application package file is a file that includes not only the file of the application, but also other files that are employed or work with the application. In the case of the ANDROID operating system, an APK file is essentially an archive file containing the executable file of the application (i.e., the DEX file of the application), the resource files needed by the application to run, and other files. The method 300 is explained with reference to the components of the system 200 of FIG. 2 for illustration purposes only. The method 300 may be performed by the repackaging module 211.

In the example of FIG. 3, the secured application package file is a secured APK file 220 and the original application package file is an APK file 212. The repackaging module 211 unpacks the APK file 212 (step 301) to allow access to the files archived in the APK file 212, including access to the original DEX file of the application. The manifest of the APK file 212 is modified to insert a reference to the wrapper Activity 228 (step 302). The repackaging module 211 generates the encrypted DEX file 225 by encrypting the original DEX file, which comprises the original classes of the application as included in the APK file 212 (step 303). The repackaging module 211 copies the resource files 223 and raw data from the APK 212 to the secured APK file 220 (step 304). The repackaging module 211 may copy resource files and raw data from the APK file 212 to the secured file 220 without modification. The repackaging module 211 adds the stub DEX file 224 comprising the wrapper Activity 228 and the configuration file 227 to the secured APK file 220 (step 305). The repackaging module 211 adds the native library 226 comprising the JNI implementation of the decryptor class loader 229 to the secured APK file 220 (step 306). The repackaging module 211 packages the secured APK file 220 to include the manifest 221, the signature 222, the resource files 223, the stub DEX file 224, the encrypted DEX file 225, the native library 226, and the configuration file 227. The secured APK file 220 may be provided to a mobile computing device running the ANDROID operating system, such as the ANDROID device 250. The ANDROID device 250 may receive the secured APK file 220 directly from the customer computer system 210, another computer system, or an ANDROID app store, for example.

Figure 4:
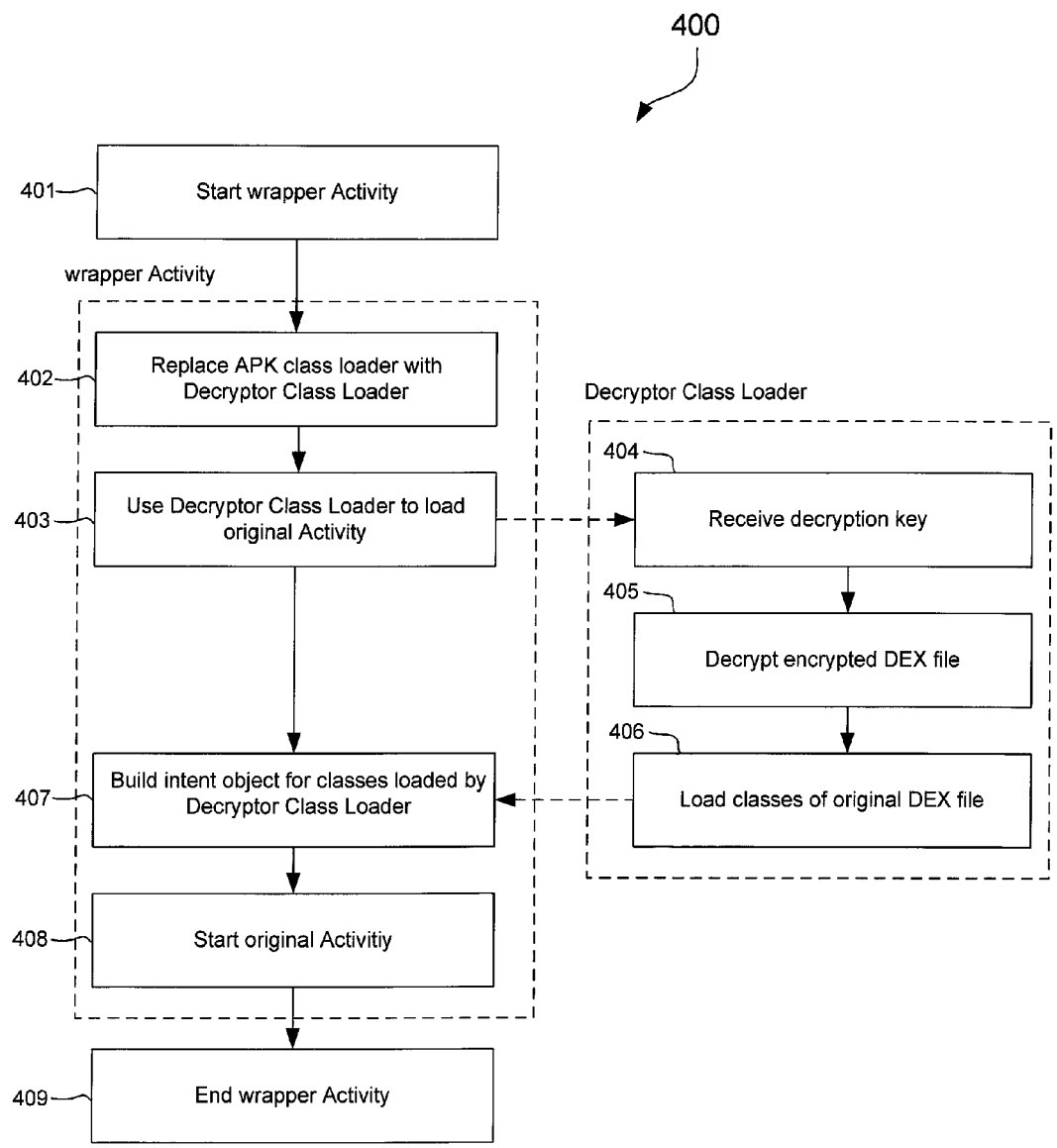
FIG. 4 shows a flow diagram of a computer-implemented method of executing a secured application package file in a mobile computing device in accordance with an embodiment of the present invention.

FIG. 4 shows a flow diagram of a computer-implemented method 400 of executing a secured application package file in a mobile computing device in accordance with an embodiment of the present invention. The method 400 is explained with reference to the components of the system 200 of FIG. 2 for illustration purposes only. The method 400 may be performed by the ANDROID device 250, with the steps 402, 403, 407, and 408 by executing the wrapper Activity 228, and the steps 404-406 by executing the decryptor class loader 229.

The method 400 begins when the wrapper Activity 228 is started (step 401), such as when the application associated with the secured APK file 220 is selected by the user for execution. When the wrapper Activity 228 executes, it replaces the APK class loader normally employed by the ANDROID operating system 251 to load classes with the decryptor class loader 229 (step 402).

The decryptor class loader 229 consults the configuration file 227 to determine the main Activity to be loaded, which in this case is the original Activity of the APK file 212 ("original Activity"). The decryptor class loader 229 loads the original Activity into the Dalvik virtual machine of the ANDROID operating system 251 (step 403). In one embodiment, the decryptor class loader 229 loads the original Activity by receiving the decryption key for decrypting the encrypted DEX file 225 (step 404), decrypting the encrypted DEX file 225 to recover the original DEX file of the APK file 212 (step 405), and loading the classes of the original DEX file into the Dalvik virtual machine of the ANDROID operating system 251 (step 406). The decryptor class loader 229 may receive the decryption key locally or from a remote server computer system, for example. By decrypting the encrypted DEX file 225 to recover the original DEX file and loading the classes of the original DEX file, the decryptor class loader 229 allows the functions of the application to be executed by the Dalvik virtual machine.

The wrapper Activity 228 builds an intent object for the classes loaded by the decryptor class loader 229 (step 407). The wrapper Activity 228 then starts the original Activity (step 408). The wrapper Activity thereafter ends (step 409). As can be appreciated, the original Activity now executes as intended by the developer of the APK file 212, while being protected from reverse engineering by the secured APK file 220. That is, decompiling the secured APK file 220 does not reveal the contents, more particularly the system calls, employed by the application because of the encryption of the original DEX file. The application is thus secured from reverse engineering while still allowing the application to execute normally.

Embodiments of the present invention may be employed to perform other security functions in mobile computing devices, not just to protect applications from reverse engineering. For example, the decryptor class loader 229 may also replace one or more original classes of the original DEX file with security classes. The security classes may be configured to hook critical function calls, such as SMS sender (in the case of anti-premium service abuse), for monitoring and evaluation.

Methods and systems for generating and executing secured application package files for mobile computing devices running mobile operating systems have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a secured application package file in a mobile computing device, the secured application package file comprising an encrypted Dalvik executable (DEX) file, a second DEX file, and a decryptor class loader;
executing the second DEX file to start a wrapper Activity that replaces a class loader of Activity of an ANDROID operating system Dalvik virtual machine of the mobile computing device with the decryptor class loader and loads the decryptor class loader;
using the decryptor class loader to decrypt the encrypted DEX file to recover a first DEX file;
using the decryptor class loader, instead of the class loader of Activity of the Dalvik virtual machine of the mobile computing device, to load classes of the first DEX file into the Dalvik virtual machine of the mobile operating system; and
using the wrapper Activity to start an Activity that uses classes from the first DEX file.

2. The method of claim 1 further comprising, prior to receiving the secured application package file in the mobile computing device:
obtaining the first DEX file from an application package file;
encrypting the first DEX file to generate the encrypted DEX file; and
including the encrypted DEX file in the secured application package file.

3. The method of claim 2 further comprising, after including the encrypted DEX file in the secured application package file:
forwarding the secured application package file from a computer system to the mobile computing device over a computer network.

4. The method of claim 2 further comprising:
copying resource files from the application package file to the secured application package file.

5. The method of claim 1 wherein the mobile computing device comprises a mobile phone, and further comprising:
receiving the secured application package file in the mobile phone from a computer system.

6. The method of claim 1 further comprising:
receiving a decryption key in the mobile computing device from a server over a computer network; and
using the decryption key to decrypt the encrypted DEX file in the mobile computing device.

7. The method of claim 1 further comprising:
replacing a class of the first DEX file with another class prior to loading classes of the first DEX file into the Dalvik virtual machine.

8. A system comprising:
a computer system with a processor and memory, the computer system being configured to unpack an application package file, to encrypt a first Dalvik executable (DEX) file of the application package file to generate an encrypted DEX file, and to include the encrypted DEX file, a second DEX file, and resource files of the application package file into a secured application package file; and
a mobile computing device configured to receive the secured application package file, to execute the second DEX file to start a wrapper Activity that replaces a class loader of Activity of an ANDROID operating system Dalvik virtual machine with a decryptor class loader, to launch the decryptor class loader, to execute the decryptor class loader to decrypt the encrypted DEX file to recover the first DEX file, to execute the decryptor class loader to load classes of the first DEX file into the Dalvik virtual machine, to use the wrapper Activity to start an Activity that uses the classes of the first DEX file, and to execute the classes of the first DEX file in the Dalvik virtual machine.

9. The system of claim 8 wherein the mobile computing device comprises a mobile phone.

10. The system of claim 8 wherein the mobile computing device comprises a tablet.

11. The system of claim 8 wherein the mobile computing device is further configured to receive a decryption key for decrypting the encrypted DEX file.

\* \* \* \* \*